June 14, 1966 R. E. MAPLES 3,255,960
DEVICE FOR CONVERTING BINARY OR DECIMAL
CODE INTO PRINTED DECIMAL DATA
Filed July 24, 1963 5 Sheets-Sheet 1

Inventor:
Richard E. Maples
Dradolph, Love & Rogers
Attorneys

Inventor:
Richard E. Maples
Gradolph, Love & Rogers
Attorneys

Inventor:
Richard E. Maples
Dradolph, Love & Rogers
Attorneys

June 14, 1966 R. E. MAPLES 3,255,960

DEVICE FOR CONVERTING BINARY OR DECIMAL CODE INTO PRINTED DECIMAL DATA

Filed July 24, 1963 5 Sheets-Sheet 4

Inventor:
Richard E. Maples
Dradolph, Love & Rogers
Attorneys

Inventor:
Richard E. Maples
Gradolph, Love & Rogers
Attorneys 3,255,960
Patented June 14, 1966

3,255,960

DEVICE FOR CONVERTING BINARY OR DECIMAL CODE INTO PRINTED DECIMAL DATA

Richard E. Maples, Chicago, Ill., assignor to Victor Comptometer Corporation, Chicago, Ill., a corporation of Illinois Filed July 24, 1963, Ser. No. 297,395
4 Claims. (Cl. 235—61)

This invention relates in general to a mechanical device for translating a digit stored in the form of a binary or weighted decimal digit code represented by electrical signals into a corresponding mechanical movement for controlling an adding or calculating machine to provide a corresponding decimal output.

Today one of the most common arrangements for storing or recording information is through the use of electrical signals or markings corresponding to binary or weighted decimal digit codes. A weighted decimal digit code is a code employing markings equivalent to various decimal digits and whose additive relationship is equivalent to a corresponding decimal digit. A binary code is a weighted decimal digit code, and it may employ respective markings corresponding to the decimal digits one, two, four, eight, or one, two, two, and four, for example, and which when combined additively correspond to the decimal digits. In any event it is often convenient or necessary to monitor the stored information in order to provide an easily read decimal indication thereof or to provide easily read arithmetic computations of the decimal equivalents.

The most convenient manner of doing this is to utilize the printing and accumulating apparatus of an adding machine in which a printing segment and accumulator are provided for each decimal digit order. This permits a decimal digit to be printed for each stored binary number in the corresponding order and if desired an arithmetic computation may be performed thereon and then printed. Since the adding machine depends, however, on a mechanical movement for each decimal digit order through one of a respective series of keys, as explained for example in United States Patent No. 2,411,050 issued to Thomas O. Mehan, November 12, 1946, and since the stored information is represented by electrical signals, the stored information must be translated into an appropriate mechanical movement.

It is, therefore, a primary object of the present invention to provide an improved apparatus for translating electrical signals representing a digit in a number system employing a base other than ten into a mechanical movement corresponding to the appropriate decimal digit.

It is a further object to provide apparatus for translating digital information stored electrically in any one of a plurality of binary or weighted decimal digit codes into mechanical movements representing corresponding decimal digits.

It is a further object to provide improved and more economical apparatus for translating electrical signals representing digital information in one number system into a mechanical movement corresponding to any one of a plurality of respective decimal digits.

Briefly, the objects of the present invention are accomplished through a mechanical translator for each decimal digit order. Each translator is provided with an electromagnet individual to the various stages of a binary input and which are energized by an electrical signal when a binary digit corresponding to the respective stage has been stored. An identical slide bar is provided for each electromagnet, and it is movable a distance corresponding to the input binary digit when the adding machine stop slide is operated and the magnet has been energized. A common group of links arranged in a descending matrix of identical horizontal links and identical vertical links transmits the movement of the stop slide to the slide bars in a manner that permits the stop slide to move a distance corresponding to the decimal equivalent of all the operated electromagnets thereby to position the stop slide accordingly. The stop slide is of a conventional type such as described in the aforementioned patent and when moved in accordance with the decimal equivalent of the binary input, it sets both a printing segment and an accumulator of an adding machine in a manner similar to that described in the aforementioned patent to print the decimal equivalent and to enter the corresponding amount in the accumulator. Should it be desired to take the total or subtotal of the amount entered in the accumulator, the translators are provided with a slide operated from the total and subtotal taking mechanism of the adding machine to release the translators from controlling the movement of the stop slides and rack bars and to permit their movements to be controlled by the accumulator in the conventional manner.

The above and other objects of the present invention will become apparent on examination of the following specification and claims together with the drawings wherein:

Figure 1:
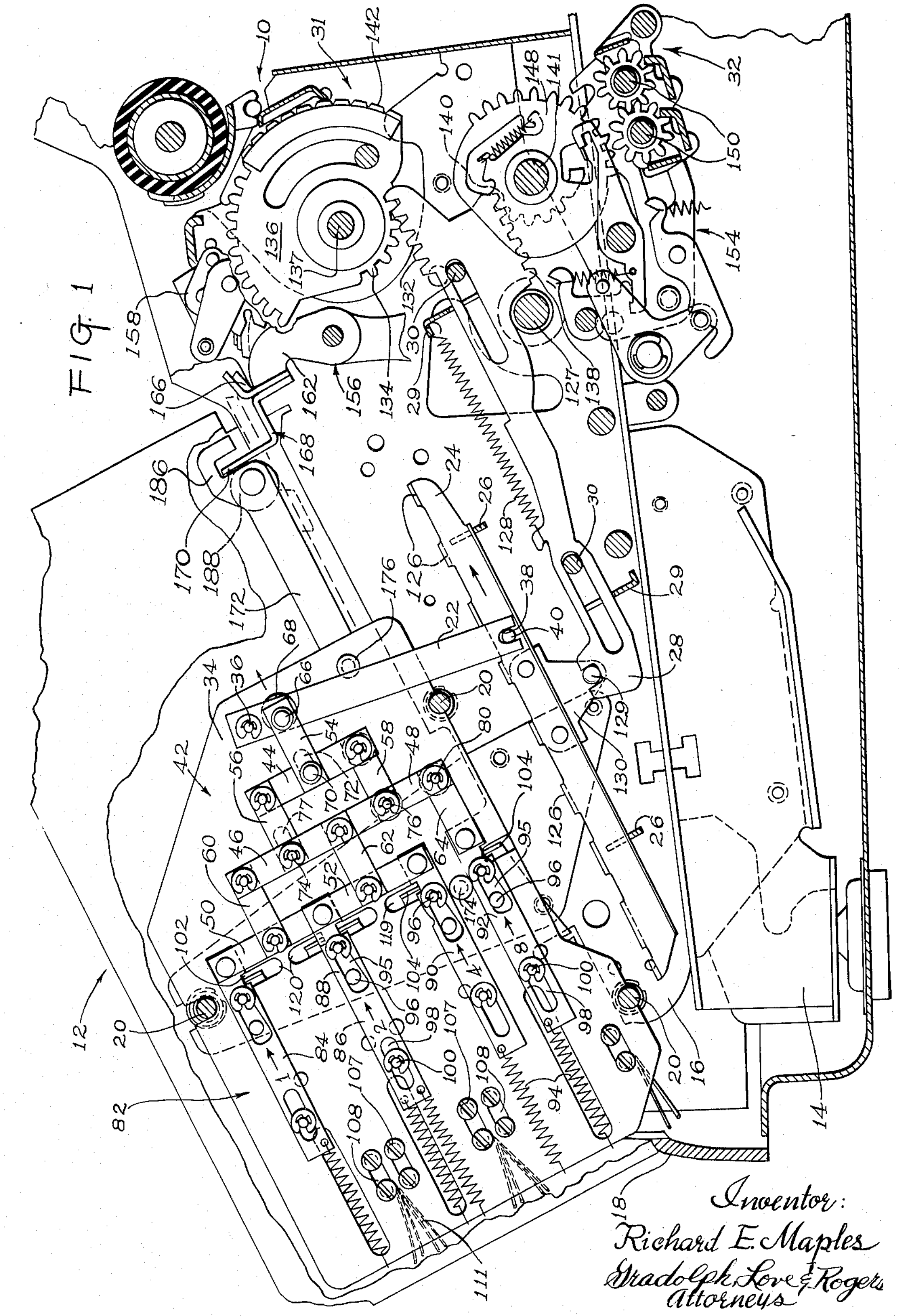
FIG. 1 is a longitudinal vertical sectional view through an adding machine and illustrates the mechanical translator together with relevant portions of the adding machine for one decimal digit order.

Referring to FIG. 1 of the drawings, there is illustrated a representative portion of an adding machine assembly 10 for one decimal or denominational digit order together with a mechanical translator assembly 12 for that order. The assembly 10 is similar to the corresponding portions of that disclosed in the aforementioned patent.

The adding machine assembly 10 comprises a base frame 14 having vertical side plates 16 and a casing 18 which encloses the assemblies 10 and 12. A plurality of spaced apart rods 20 supported between the side plates 16 carry the translator assemblies 12 for all of the decimal digit orders for the machine 10. Each translator assembly 12 has an output member 22 which cooperates with a stop slide 24 for each digit order. The stop slide 24 is guided by a pair of spaced apart combs 26 and normally its movement is controlled in increments corresponding to the digits entered from a keyboard to in turn limit the movement of a rack bar 28 which moves the stop slide 24.

The rack bar 28 in turn is supported and guided by combs 29 and rods 30, and it is adapted to control a printing assembly 31 for printing the decimal equivalent of the movement of the stop slide and for controlling an accumulator assembly 32.

Figure 6:
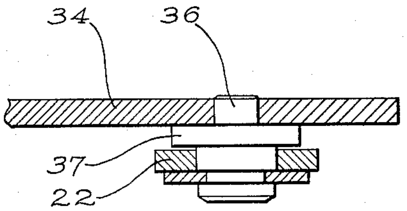
FIG. 6 is an enlarged sectional view taken along the line 6—6 of FIG. 2, looking in the direction of the arrows.

Each translator assembly 12 comprises a base plate 34 supported in a vertical plane on the rods 20. The output member 22 is pivotally mounted at its upper end on a pin 36 fixed to the plate 34. A suitable spacer 37 may be located between the plate 34 and the member 22 to properly locate the member 22 (FIG. 6). The member 22 has a slot 38 in its lower end to embrace a pin 40 carried on the stop slide 24 whereby the linear movement of the stop slide pivots the output member 22 about its pin 36.

Figure 2:
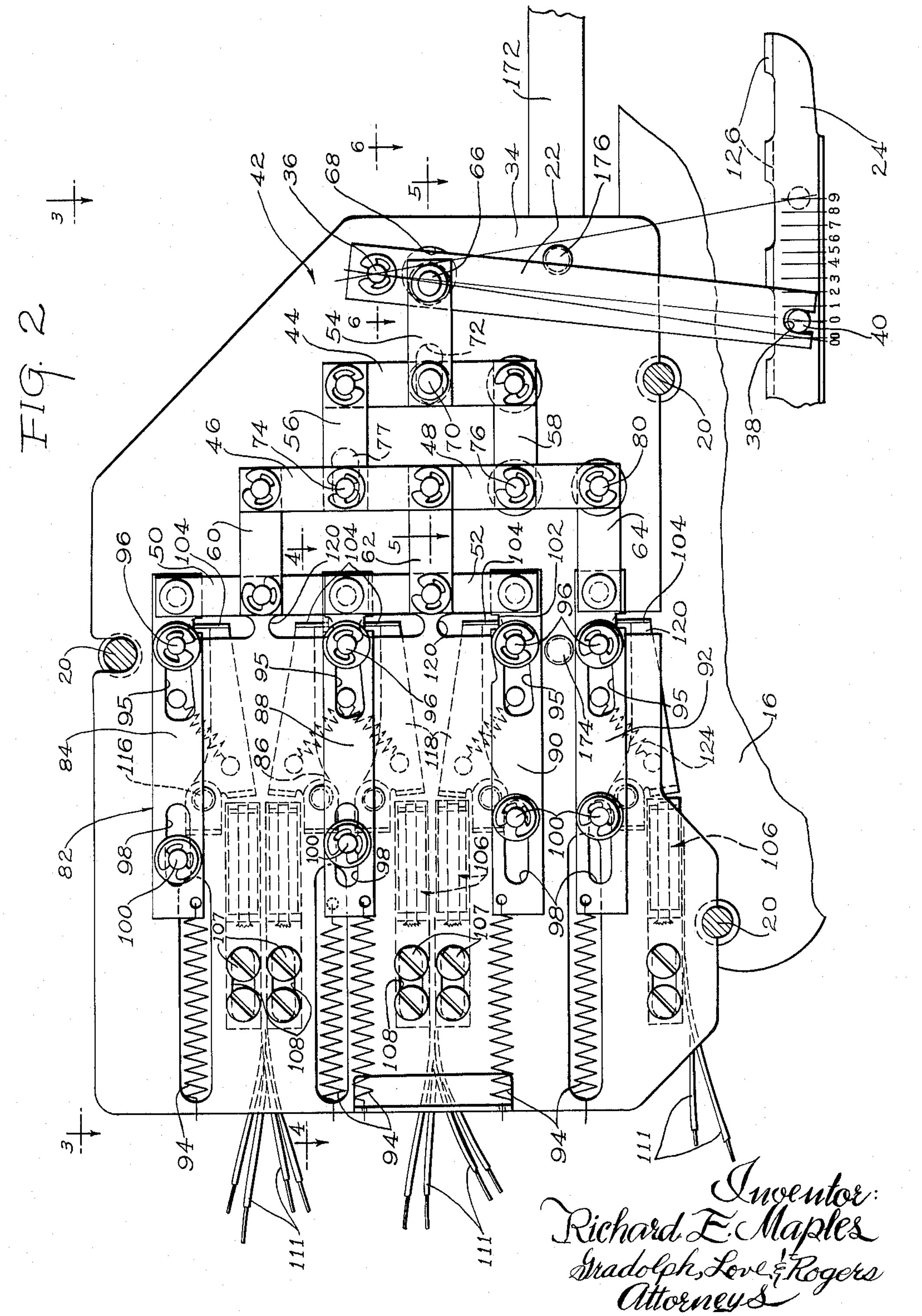
FIG. 2 is an elevational or face view of the translation assembly showing it in greater detail together with a scale of the various incremental decimal movements permitted by the translator in correspondence with different binary inputs.

The limit of pivotal movement of the output member 22 is determined by a link matrix generally indicated by the reference character 42. The limits are indicated in FIG. 2 and correspond to the decimal values of the digits for each order. The link matrix 42 comprises (as viewed in FIG. 2) a series of vertically disposed identical pivot links 44, 46, 48, 50 and 52 and horizontally disposed identical actuating links 54, 56, 58, 60, 62 and 64. The link matrix is arranged in columns and rows of descending number from left to right or front to rear, as seen in FIGS. 1 and 2, and terminates in the actuating link 54 which is pivotally connected to the output member 22 by a pin 66 slightly below the pivot 36.

The pin 66 projects through an aperture 68 in the plate 34 to enable an adjustment to be made on an eccentric connection 67 to the link 54 so that the extent of pivotal movement of the member 22 will accurately represent the digital value translated for limiting movement of the stop slide 24.

Figure 3:
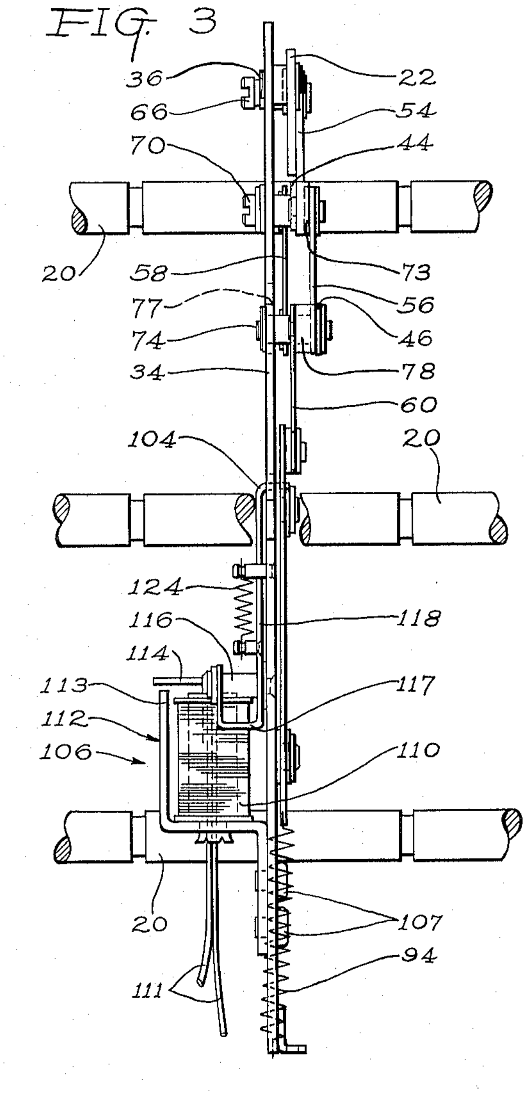
FIG. 3 is a plan view taken along the line 3—3 of FIG. 2, looking in the direction of the arrows.

The link 54 is in turn pivotally supported by means of another eccentric connection 69 on the pivot link 44 intermediate its ends, and a pin 70 in turn pivotally carries the link 44. The pin 70 is slidably engaged in a guide slot 72 in the plate 34 by means of a suitable retaining ring. The longitudinal axis of the slot 72 is horizontally aligned so that the pin 70 and the link 54 are constrained for rearward and forward movement in response to the pull exerted by the output member 22 and the limitations imposed by the link 44. The opposite ends of the line 44 are pivotally connected to the actuating links 56 and 58 with the link 56 being spaced in a plane above and parallel to the plane of the link 58 as considered with reference to the plane of FIG. 1 by means of a spacer 73 between links 56 and 44 as seen in FIG. 3.

The actuating links 56 and 58 are in turn pivotally connected on pins 74 and 76 intermediate the ends of the pivot links 46 and 48 respectively. The pivot pin 74 extends through a guide slot 77 in the plate 34 whereby the pin is constrained for movement in a rearward and forward direction along the axis of the slot 77, and the linkage is supported on the plate 34.

Figure 5:
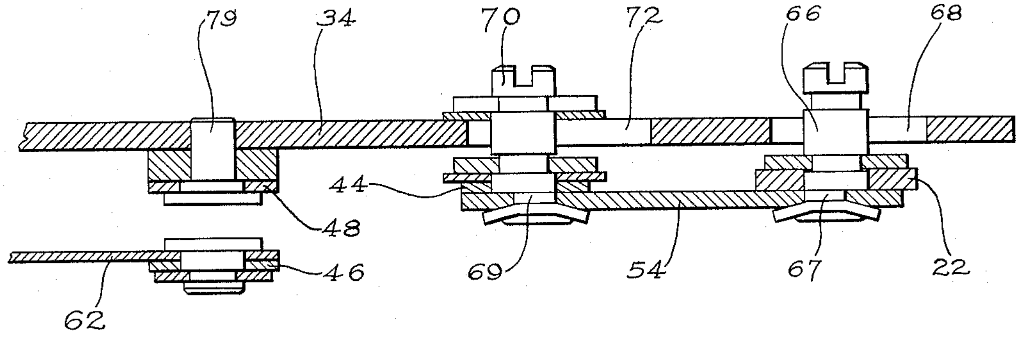
FIG. 5 is an enlarged sectional view taken along the line 5—5 of FIG. 2, looking in the direction of the arrows.

The upper and lower ends of the line 46 are pivotally connected to the actuating link 60 by means of a rivet with a spacer 78 (FIG. 3) and to the actuating link 62 by means of a rivet (FIG. 5), respectively, so as to place link 60 in another plane behind and parallel to link 62 as considered with reference to the plane of FIG. 1. The upper end of the link 48 is pivotally connected to the plate 34 on pin 79 (FIG. 5) located directly below the pivot connection between links 46 and 62 when the links are at rest. The lower end of the link 48 is pivotally connected to the link 64 by means of a pin 80. The actuating links 60 and 62 are in turn pivotally connected to the links 50 and 52, respectively, intermediate their ends.

Figure 4:
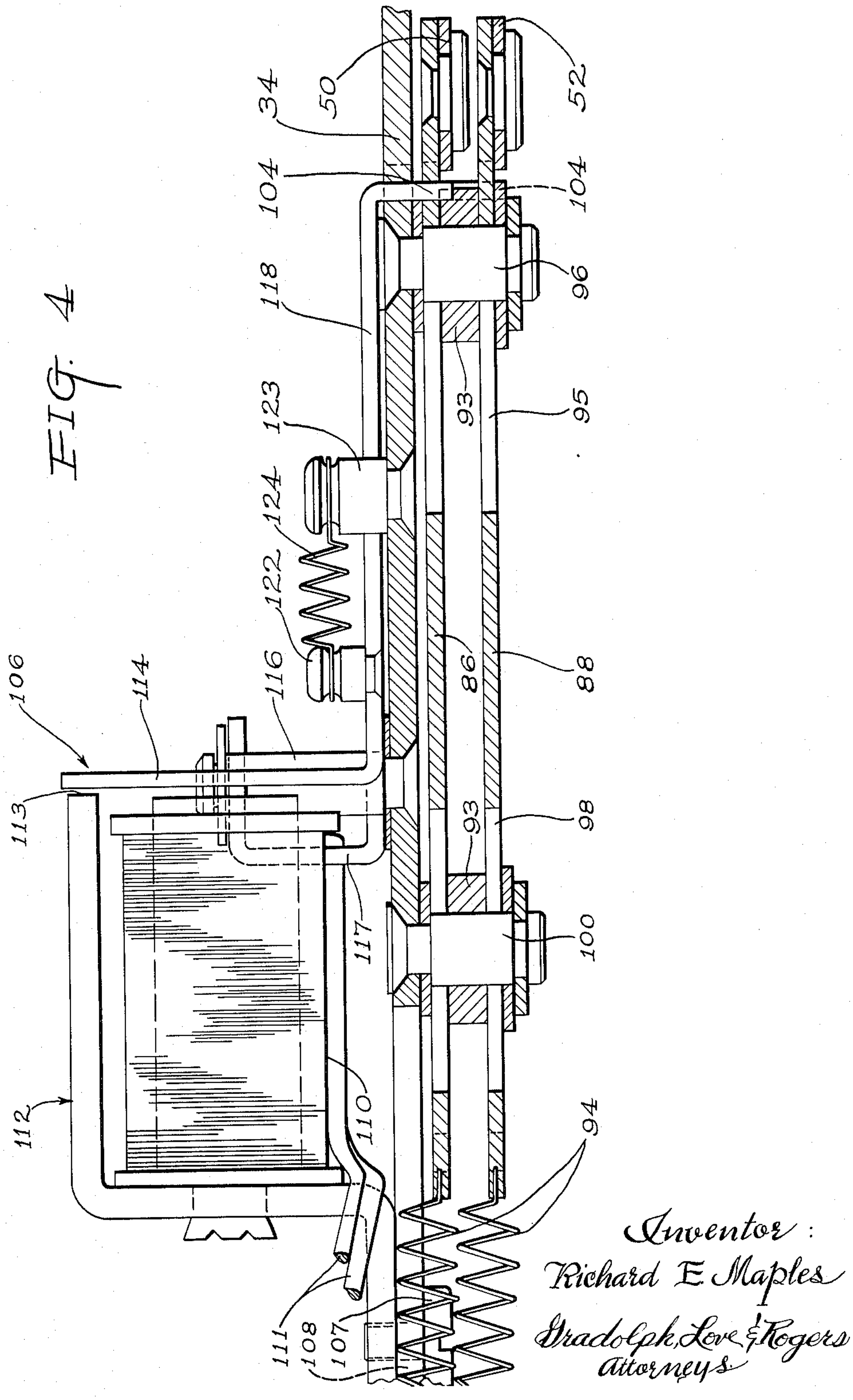
FIG. 4 is an enlarged sectional view taken along the line 4—4 of FIG. 2, looking in the direction of the arrows, to illustrate the manner in which the magnet assembly is supported.

The link matrix 42 is controlled by a slide bar assembly 82 comprising identical slide bars 84, 86, 88, 90 and 92. The slide bars 88 and 90 are located in a plane parallel to and offset to the front of slide bars 84, 86 and 92 as considered with reference to the plane of FIG. 1 by means of appropriate spacers 93 with the slide bar 86 being located directly under the bar 88 and in overlapping relationship therewith as best seen in FIG. 4. The slide bars 84 and 86 are pivotally connected to the opposite ends of the link 50. The slide bars 88 and 90 are pivotally connected to the opposite ends of the link 52, and the slide bar 92 is pivotally connected to the free end of the actuating link 64.

The slide bars 84, 86, 88, 90 and 92 are assigned the binary values 1, 2, 2, 4, and 8, respectively. Thus the slide bars 86 and 88 each correspond to the digit 2 and by using one or both bars 86 and 88 for the binary value 2, either the binary code 1, 2, 2, 4 or the binary code 1, 2, 4, 8 may be translated. These are commonly used codes, but it is to be understood that other codes can be translated by properly limiting the movements of the slide bars.

The slide bars 84, 86, 88, 90 and 92 are normally biased forwardly by springs 94 connected between the forward ends of the bars and the forward edge of the plate, and each is provided with a slot 95 having an end adapted to be abutted against a stop and guide post 96 mounted on the plate 34 to determine the normal or at rest position of the slide bars which is the position illustrated in the drawings.

A second slot 98 is also provided in each slide bar and it is adapted to cooperate with a second stop and guide post 100 to limit the rearward travel of the slide bars against the tension of the springs 94. The posts 100 are positioned on the plate 34 so as to permit the slide bars each to travel an individually determined distance which corresponds to the binary value assigned thereto. Additionally, it will be noted that the slots 95 are slightly enlarged at their forward ends so that they may accommodate a slight pivotal movement of the bars about the posts 100. For the bars 86 and 88 a single pair of posts 96 and 100 serve for both.

One edge of each slide bar is notched at 102 adjacent its rearward end, and each notch is engaged by a latch 104. The notches 102 in slide bars 86 and 88 are provided along opposite edges to accommodate the latches 104 disposed along opposite edges thereof. When the slide bars are in their normal or rest positions, each latch 104 is engaged in its respective notch 102.

Each latch 104 is part of an electromagnetic assembly 106 mounted on the side of plate 34 opposite the link matrix 42 by means of screws 107 extending through positioning slots 108 in the plate 34 to a mounting bracket 112. Each magnetic assembly 106 corresponds to one of the aforementioned binary values 1, 2, 2, 4 and 8, and each includes a coil 110 adapted to be energized over leads 111 connected to a tape reader or similar information feeding device (not shown).

Each mounting bracket 112 includes a stop 113 adapted to cooperate with an armature 114 integral with the latch 104, and the screw 107 and slots 108 enable the coil and bracket accurately to be positioned with respect to the armatures. Each armature 114 is pivotally mounted on a pin 116 carried by the plate 34 by means of an offset yoke arm 117, and each yoke arm has a horizontal extension 118 parallel to the plane of plate 34 which has formed on its outer end the offset latch 104 projecting through an aperture 120 to engage the appropriate slide bar. The arms 118 are biased by springs 124 extending between posts 122 and 123 normally to hold the armatures 114 away from the stops 113 and the latches 104 engaged in the notches 102 in the slide bars.

In a conventional adding machine the stop slide 24 is normally controlled from a full keyboard and is provided with projections 126 adapted to cooperate with the keys for controlling the distance travelled by each stop slide. This control is now provided by the output member 22 which serves to stop the slide 24 after it has travelled a distance corresponding to the total registered in the various binary stages 1, 2, 4, 8 or 1, 2, 2, 4 or whatever code the device is arranged to receive.

The stop slide 24 is moved rearwardly by the rack bar 28, when the rack bar is released, in response to the operation of a main shaft 127 from a drive assembly (not shown). The drive assembly may be actuated from a desired source such as a tape or other automatically operated apparatus or may be manually actuated to operate the main shaft for the appropriate machine cycle. During the first portion of the machine cycle the rack bar is released to move rearwardly under the force of spring 128. The slide is engaged with the rack bar 28 by a pin 129 carried by a depending bracket 130 and it also is moved rearwardly. The member 22 is pivoted counterclockwise about the pin 36 to pull the link 54 rearwardly. This exerts a pull on all the other links and the slide bars rearwardly against the springs 94 and from the 00 position noted in FIG. 2.

The rack bar 28 has an upper rack 132 which cooperates with a gear segment 134 on a type carrying wheel 136 mounted on a shaft 137 of the printing assembly 31. The rack bar has a lower rack 138 which cooperates with an adding sector 140 mounted on a bushing carried by a shaft 141 for entering an amount into the accumulator assembly 32.

The rack bar 28 is moved rearwardly during the first portion of the machine cycle to a position determined by the stop slide 24 and translator matrix 42. It thus controls the position of the type carrying wheel 136 to print the entered digit 0–9 on a suitable tape during the subsequent portion of the machine cycle in a known manner.

The rearward movement of the rack bar 28 during the first portion of the machine cycle also controls the position of the adding sector 140. The adding sector in turn positions an accumulator sector 148 also carried by the bushing on shaft 141 through a lost motion mechanism so that an amount may if desired be entered into the accumulator 32 during a subsequent portion of the machine cycle.

The accumulator sector 148 is engageable with one or the other of a set of accumulator pinions 150 in the accumulator 32 mounted on a swingable carriage assembly 154 for either an add or subtract operation.

If all the magnetic assemblies 106 are deenergized when the machine is operated, the stop slide 24 is permitted only a limited movement corresponding to the digit zero and indicated by the vertical line marked 0 in FIG. 2. The stop slide 24 can move only as far as permitted by the matrix 42, and since the slide bars 84, 86, 88, 90 and 92 can move only a distance permitted by the latches 104, the translation matrix movement is terminated before entry of a digit other than zero. In response to the movement of the stop slide rearwardly, the member 22 is pivoted counterclockwise and exerts a pull through the link 54 and the other links on the slide bars. The pivot connections between the links and slide bars therefore move rearwardly as far as permitted by the latches 104 so that the pivot connections have a corresponding zero position when the slide bars are engaged with the latches 104. The machine is thus conditioned to enter a zero into any denominational order when the rack bar is not released to move rearwardly.

In the event the binary digit 1 is registered by operation of the appropriate coil 110, the latch 104 associated with the slide bar 84 is retracted. When the stop slide 24 is thereafter moved rearwardly, the link 50 is pivoted about its connection with the slide bar 86 after that slide bar reaches its zero position, the pull being exerted through the links 54, 44, 56, 46 and 60. The distance the slide 24 may move rearwardly is determined by the distance the slide bar 84 can move rearwardly as limited by its stop post 100. This distance is sufficient to permit the stop slide 24 to enter the digit 1 into the accumulator and to cause it to be printed on the tape in the proper denominational order (FIG. 2).

If, on the other hand, the binary digit 2 were registered, either or both the latches 104 associated with the bars 86 and 88 would be released depending on which binary code is being used and which binary stage had a digit registered therein. Thus, if the binary code having digit values corresponding to digits 1, 2, 4, 8 is used, only bars 84, 86, 90 and 92 could be released for movement since only the coils 110 associated therewith could be energized, while if the binary code 1, 2, 2, 4 is utilized, only bars 84, 86, 88 and 90 could be released since only the coils 110 associated therewith would be energized. In the case of binary code 1, 2, 4, 8, only the bar 86 can be released for movement when the digit 2 is registered, while in the case of binary code 1, 2, 2, 4, either or both bars 86 and 88 can be released for movement depending on whether the binary digit 2 were registered for both or either stage.

If the bar 86 only were released, the movement would be as just described except that link 50 would be pivoted about its connection with the bar 84, while the links 54, 44, 56, 46 and 60 would move as previously described. However, the distance the slide bar 86 moves before being halted by the stop post 100 is greater than the movement distance for the slide bar 84, and consequently the output member 22 would be pivoted a correspondingly greater distance in the counter-clockwise direction by the stop slide 24 so that the digit 2 would be entered into the accumulator and printed on the tape.

With the bar 88 only released, an identical increment of movement would be permitted the output member 22 except that the link 52 now pivots about its connection with bar 90 and the links 54, 44, 56, 46 and 62 move under the pull exerted by the output member 22.

If the code 1, 2, 2, 4 were being used, both bars 86 and 88 could be released as explained. In this event, the link 50 pivots about its connection with the bar 84 and the link 52 pivots about its connection with the bar 90 in response to the movement of the output member 22 to the position corresponding to the digit 4 and the movement of the stop slide 24 is limited accordingly.

For each other possible binary digit 4 or 8, a similar action takes place except that in this event slide bars 84, 86 and 88 will move only to their zero position unless they too are released. Thus, in the event the latch 104 associated with the bar 90 is retracted, the link 52 pivots about its connection with the bar 88 and the movement is translated through the links 54, 44, 56, 46 and 62 from the output member 22. The slide bar 90 is permitted a greater movement than any of the individual bars 84, 86 and 88, and the output member will be pivoted in the counterclockwise direction by the stop slide 24 until arrested in the position where the digit 4 will be entered into the accumulator and printed on the tape.

When the latch 104 associated with the slide bar 92 is released, the output member 22 will move the links 54, 44, 58, 48 and 64, with the link 48 pivoting on the pin 79 carried by the plate 34. The output member 22 is pivoted in the counterclockwise direction by the stop slide 24 to the position where the digit 8 will be entered into the accumulator and printed on the tape.

Since the movement of the output member 22 is determined by the pivoting of the link 44 about its pivot connections to the links 56 and 58 and since the forward or rearward positioning of these pivot connections is determined by which of the latches 104 are disengaged from their respective slide bars, the output member 22 may be positioned in accordance with the decimal additive values of the respective binary digits.

Thus, if the slide bars 84 and 92 are both released, the link 44 not only pivots on its connections to the links 56 and 58 but moves bodily rearwardly so that the additive decimal value of the binary digits corresponding to the slide bars 84 and 92, namely the sum of 1 and 8 respectively, or the decimal digit 9, is entered in the accumulator and printed on the tape as the output member 22 stops the rearward movement of the slide 24 at the value 9 position. Under correspondingly similar conditions, if the slide bars 84 and 90, corresponding to the entry of the decimal digits 1 and 4, respectively, have their latches 104 released, the additive value of their corresponding decimal digits, namely the digit 5, is entered into the accumulator and printed on the tape. The decimal digit 3 will be entered into the accumulator and printed on the tape by releasing the slide bars 84 and 86 at the appropriate time in the machine cycle. The same end result, the entry of the decimal digit 3 into the machine, can also be accomplished by releasing the slide bars 84 and 88.

If the slide bars 84, 86 and 88 are all released (using the 1, 2, 2, 4 code), the link 66 is pivoted and bodily moved rearwardly so that the output member 22 is pivoted sufficiently to enter the digit 5 into the machine. If the slide bar 90 is additionally released, the link 52 is pivoted about its connection with bar 88 and is moved bodily rearwardly to add the value of 4 to the digit 5, and thus enter the digit 9 into the machine.

If either one of the bars 86 or 88 is released in conjunction with the bar 90, either the link 50 will be pivoted about its connection with the bar 84 and link 52 will be pivoted about its connection with the bar 88 while the bar 88 is in its zero position, or the link 50 will remain in its zero position and the link 52 will pivot about its connection with the bar 88 after the connection is in a position corresponding to the digit 2. In either event then the output member will be pivoted by the stop slide 24 to the position for the entry of the digit 6 into the machine.

When using he device for the 1, 2, 4, 8 code, the slide bar 84 has the value 1, the bar 86 the value 2, the bar 90 the value 4, and the bar 92 the value 8; the bar 88 is not used. When using the device for the 1, 2, 2, 4 code, the slide bar 84 has the value 1, the bar 86 the value 2, the bar 88 the value 2, and the bar 90 the value 4; the bar 92 is not used. By the proper selection and combination of the slide bars for either code any decimal value from 1 to 9 may be entered in the denominational orders, it being understood that there is a translator for each order.

Figures 7, 8:
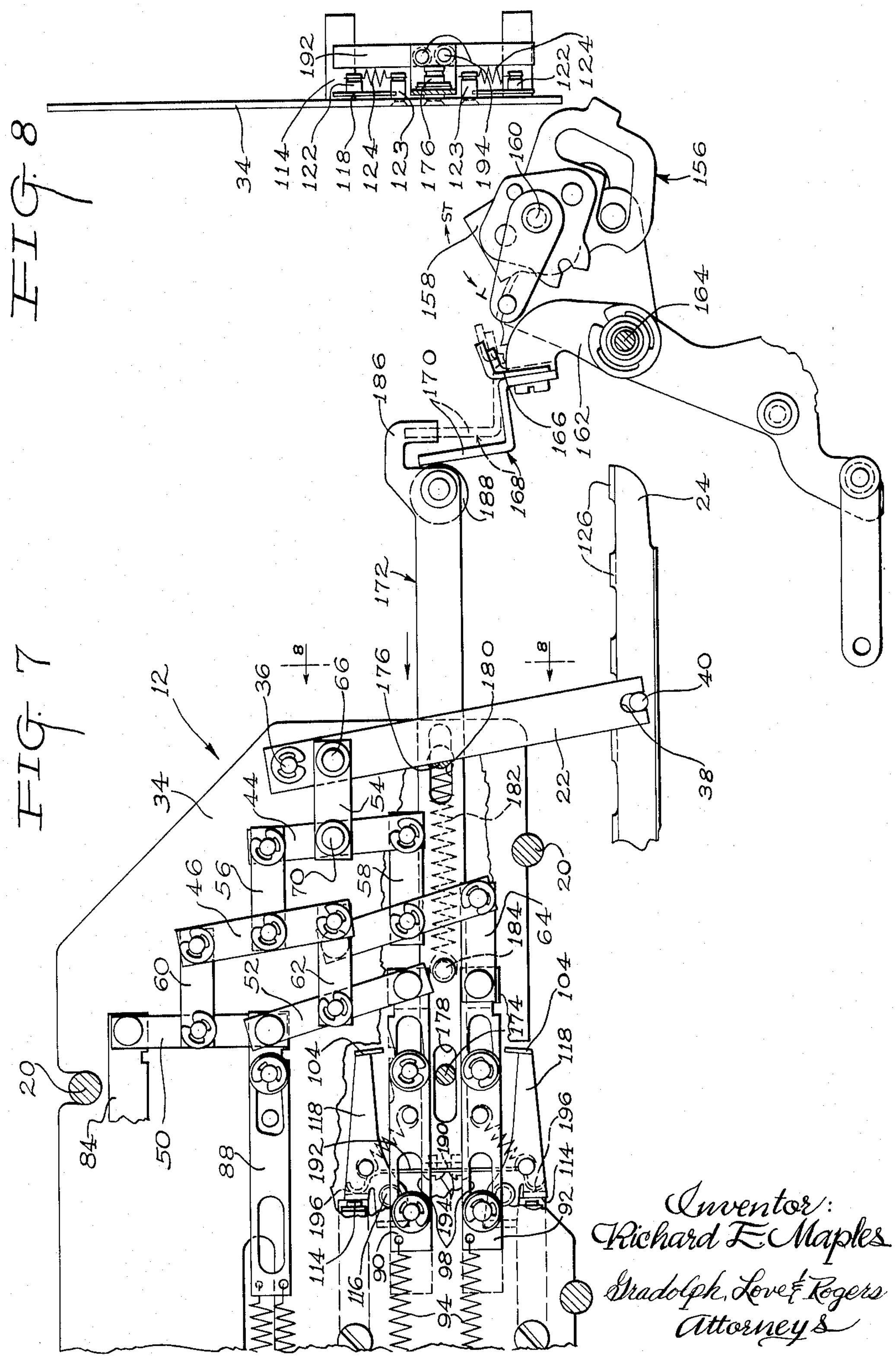
FIG. 7 is a face view of the rear portion of a translator assembly, partially broken away for purposes of clarity, illustrating the mechanism operated by the total and subtotal taking assembly to release the adding machine slides from control by the translator.
FIG. 8 is a view, partly in section, taken along the line 8—8 of FIG. 7, looking in the direction of the arrows.

The foregoing description relates to the use of the translator apparatus 12 for printing the decimal equivalent of the coded data on a tape and for entering that data in the accumulator 32. To take a total or subtotal of the amounts entered in the accumulator 32 it is necessary to release the slide 24 and rack bar 28 from the restraining control of the translator apparatus 12. The mechanism for accomplishing this is shown in FIGS. 1, 7 and 8.

In the normal operation of a full keyboard adding machine of the type generally disclosed herein, the operator moves the total key to the "total" or "subtotal" position depending upon the result sought and cycles the machine, as explained in greater detail in Patent No. 2,475,510, dated July 5, 1946, to Thomas O. Mehan, entitled "Total Taking Control." Movement of the key to the "total" position and cycling the machine causes the total taking mechanism to engage the accumulator 32 through the transfer sectors 140 and 148 with the rack 138, to release the slide 24 and rack 28 for rearward movement, to clear the keyboard (which has been removed from the illustrated machine), and to permit the slide 24 and rack bar 28 to move rearwardly. On the rearward movement of the slide 24 and rack bar 28, the accumulator pinion acts as the stop at its zero position. Thus, if the number "6" had been stored in the accumulator for a given denominational order the rearward movement of the slide 24 and rack bar 28 to clear the accumulator corresponds to the movement that would enter the digit "6" into the accumulator and this movement sets the type carrying wheel 136 to print this number in the total. The total is printed, the accumulator 32 is withdrawn from engagement with the transfer sector 148, and the slide 24 and rack bar 28 restored to their forward or start positions. This same function takes place when taking a subtotal except that the accumulator 32 is not disengaged from the transfer sector 148 until after the slide 24 and rack bar 28 have been restored to their forward positions so as to reinsert into the accumulator the printed subtotal for further calculations.

The adding machine includes a mechanism to release the slide 24 which is normally latched in its forward position. In the disclosure made herein this latch mechanism is omitted but the slide is permanently connected to the output arm 22 of the translator 12. In FIG. 7, there is shown a portion of the total taking mechanism 156, and it includes an inverted U-shaped bracket 158 mounted on a pivot 160 and movable in the counterclockwise direction when taking a total and in the clockwise direction when taking a subtotal. The total taking mechanism swings an arm 162 in the counterclockwise direction about its pivot 164. This arm carries a bail 166, which in the adding machine is a key release bail actuated on every cycle of the machine, but in this disclosure is actuated only by the total taking mechanism 156. A Z-shaped bracket 168 is welded to the bail 166 and has a leg 170 bridging across all of the translators 12 in a position to move a slide 172 carried by each translator forwardly as shown by the full lines in FIG. 7.

The slide 172 is mounted on that face of the plate 34 opposite the amount entering slides 84, 86, 88, 90 and 92 on a pair of guide pins 174 and 176 extending through slots 178 and 180, respectively, in the slide. The slide is biased rearwardly by a spring 182 connected between a pin 184 carried on the slide and the post 176.

The rear end of the slide is formed with a hook 186 to embrace the leg 170 of the bracket 168 and it carries an eccentrically adjustable circular abutment member 188 which is held in constant engagement with the bracket leg 170 by the biasing spring 182.

At its forward end the slide is formed with a flange 190 projecting in a direction away from the plate 34 to which is secured a yielding blade spring 192 by a pair of screws 194. The blade spring 192 is formed with a pair of curved ends 196 positioned to engage the armatures 114 on the pivoted arms 118 carrying the latches 104 for the slides 90 and 92. When the slide 172 is moved forwardly, the spring ends 196 engage the armatures 114 to pivot the latches 104 out of the notches in the slides 90 and 92. The blade spring 192 yields to prevent undue force from pushing the armatures 114 against the stops 113. By properly adjusting the eccentric abutment 188 proper and accurate action of the spring 192 is insured.

In taking a total or a subtotal an electrically operable element (not shown) will properly operate a total or subtotal key and the adding machine will commence the proper cycle, under the control of the main shaft 127 and the cams and levers operated thereby. At the outset of this cycle the arm 162 will be swung in the counterclockwise direction to swing the bracket 168 and leg 170 from the dotted to the full line position (FIG. 7). The leg 170 being in constant engagement with the abutment 188 on the slide 172 moves the slide forwardly until the spring ends 196 engage and pivot the armatures 114 to disengage the latches 104 from the slides 90 and 92, the total decimal value of which is the sum of 4 and 8 or 12. The output arm 22 is thus freed to move to any digit in the appropriate denominational order of the accumulator.

The accumulator 32 has been moved into engagement with the transfer sector 148. The spring 128 pulls the rack bar 28 and slide 24 rearwardly to the numerical value of the accumulator thus clearing the accumulator and setting the printing wheel 136 to print the total. The movement of the slide and rack bar pivots the output arm 22 in the counterclockwise direction thus moving the slides 90 and 92 to the extent necessary to register any value from 1 to 9 in the total.

At the conclusion of the total or subtotal taking operation slide 24 and rack bar 28 are restored to their forward positions, the arm 162, bail 166 and bracket 168 are moved to the dotted line position, the spring 182 moves the slide 172 rearwardly, and the spring ends 196 are moved from engagement with the armatures 114. The latches 104 engage and restrain the slides 90 and 92 against movement.

From the foregoing description it will be apparent that the objectives claimed for the present invention at the outset are fully attained by the disclosed apparatus.

While a preferred embodiment of the device fo converting binary or decimal code into printed decimal data has been shown and described, it will be apparent that numerous modifications and variations thereof may be made without departing from the underlying principles of the invention. It is therefore desired, by the following claims, to include within the scope of the invention all such variations and modifications by which substantially the results of this invention may be obtained through the use of substantially the same or equivalent means.

What is claimed as new and desired to be secured by United States Letters Patent is:

1. In a mechanical translator, for use in translating electrical signals each representing a different binary digit into a mechanical movement representing a decimal digit to control the input to an adding machine of the type having a stop slide movable to any one of a plurality of positions each representing a different decimal digit, an accumulator and a total taking mechanism, the combination comprising, a plurality of slide bars each representing a different binary digit normally biased in one direction and adapted to be moved in the other direction a distance corresponding to the digital value of the slide bar, a latch for each slide bar normally restraining it against movement in said other direction, an electromagnet for each slide bar connected to withdraw the slide bar latch upon energization of said electromagnet, an output member adapted to be connected to the adding machine stop slide, a descending order link matrix interconnecting each of said slide bars with said output member and permitting movement of said output member a distance corresponding to the sum of said slide bar movements in said other direction, and a release slide adapted to be moved in one direction by the total taking mechanism of the adding machine and arranged to withdraw the latches of a minimum number of said slide bars having a total value of at least that of the highest decimal digit to which the adding machine stop slide can be moved thereby releasing said output member for a total taking operation.

2. In a mechanical translator for use in translating electrical signals each representing a different binary digit into a mechanical movement representing a decimal digit to control the input to an adding machine of the type having a stop slide movable to any one of a plurality of positions each representing a different decimal digit, an accumulator and a total taking mechanism, the combination comprising, a plurality of slide bars each representing a different binary digit normally biased in one direction and adapted to be moved in the other direction a distance corresponding to the digital value of the slide bar, a latch for each slide bar normally restraining it against movement in said other direction, an electromagnet for each slide bar having an armature connected to the slide bar latch for withdrawing said latch upon energization of said electromagnet, an output member adapted to be connected to the adding machine stop slide, a descending order link matrix pivotally interconnecting each of said slide bars with said output member and permitting movement of said output member a distance corresponding to the sum of said slide bar movements in said other direction, a release slide adapted to be moved in one direction by the total taking mechanism of the adding machine, means carried by said release slide for contacting and moving the armatures of two of said slide bars having a total value of at least that of the highest decimal digit to which the adding machine stop slide can be moved thereby releasing said output member for a total taking operation, and means biasing said stop slide in a second direction wherein said slide bar latches are withdrawn by said electromagnets.

3. In a mechanical translator for use in translating electrical signals each representing a different binary digit into a mechanical movement representing a decimal digit to control the input to an adding machine of the type having a stop slide movable to any one of a plurality of positions each representing a different decimal digit, an accumulator and a total taking mechanism, the combination comprising, a plurality of slide bars each representing a different binary digit normally biased in one direction and adapted to be moved in the other direction a distance corresponding to the digital value of the slide bar, a latch for each slide bar normally restraining it against movement in said other direction, an electromagnet for each slide bar having an armature connected to the slide bar latch for withdrawing said latch upon energization of said electromagnet, an output member adapted to be connected to the adding machine stop slide, a descending order link matrix pivotally interconnecting each of said slide bars with said output member and permitting movement of said output member a distance corresponding to the sum of said slide bar movements in said other direction, a release slide having an adjustable abutment at one end thereof adapted to be engaged by a portion of the total taking mechanism of the adding machine for movement of said release slide in one direction, spring means carried by said release slide at the other end thereof for contacting and moving the armatures of an adjacent two of said slide bars having a total value of at least that of the highest decimal digit to which the adding machine stop slide can be moved thereby releasing said output member for a total taking operation, and means biasing said stop slide in a second direction wherein said slide bar latches are withdrawn by said electromagnets.

4. In a mechanical translator for use in translating electrical signals each representing a different binary digit into a mechanical movement representing a decimal digit to control the input to an adding machine of the type having a stop slide movable to any one of a plurality of positions each representing a different decimal digit, an accumulator and a total taking mechanism, the combination comprising, four slide bars movable respectively 1, 2, 4 and 8 units biased in one direction and adapted to be moved in the other direction, a latch for each slide bar normally restraining it against movement in said other direction, an electromagnet for each slide bar having an armature connected to the slide bar latch for withdrawing said latch upon energization of said electromagnet, an output member adapted to be connected to the adding machine stop slide, a descending order link matrix pivotally interconnecting each of said slide bars with said output member and permitting movement of said output member a distance corresponding to the sum of said slide bar movements in said other direction, a release slide adapted to be moved in one direction by the total taking mechanism of the adding machine, and means carried by said release slide for contacting and moving the armatures of the 4 and the 8 unit slide bars thereby releasing said output member for a total taking operation.

References Cited by the Examiner

UNITED STATES PATENTS

| | | | |
|---|---|---|---|
| 2,066,762 | 1/1937 | Bryce | 235—61 |
| 2,077,962 | 4/1937 | Smith | 235—200 X |
| 2,179,822 | 11/1939 | Imm | 235—61 |
| 2,767,907 | 10/1956 | Schwend | 235—61 |
| 2,772,048 | 11/1956 | Collison et al. | 235—61 |
| 2,987,243 | 6/1961 | Parker | 235—61 |
| 3,009,633 | 11/1961 | Dilks et al. | 235—61 |
| 3,017,080 | 1/1962 | Schwend | 235—61 |
| 3,025,510 | 3/1962 | Lovejoy | 340—347 |
| 3,034,717 | 5/1962 | Werner | 235—146 |
| 3,126,799 | 3/1964 | Stauffer | 95—4.5 |

LEO SMILOW, *Primary Examiner.*

T. J. ANDERSON, *Assistant Examiner.*